United States Patent
Sohn et al.

(10) Patent No.: US 11,890,552 B2
(45) Date of Patent: Feb. 6, 2024

(54) DRONE-PASSING MULTIPLE DETECTION SENSOR GATE AND DRONE GAME SYSTEM USING SAME

(71) Applicant: MADVENTURE CO., LTD., Jeju-si (KR)

(72) Inventors: Wan Il Sohn, Seoul (KR); Mi Kyoung Sohn, Jeju-si (KR); Sung Il Kim, Seoul (KR); Sung Hoon Kim, Seoul (KR); Tae Gyu Kim, Paju-si (KR); Hyun Il Jung, Seoul (KR)

(73) Assignee: MADVENTURE CO., LTD., Jeju-si (KR)

( * ) Notice: Subject to any disclaimer, the term of this patent is extended or adjusted under 35 U.S.C. 154(b) by 353 days.

(21) Appl. No.: 17/434,969

(22) PCT Filed: Oct. 28, 2019

(86) PCT No.: PCT/KR2019/014235
§ 371 (c)(1),
(2) Date: Aug. 30, 2021

(87) PCT Pub. No.: WO2020/179983
PCT Pub. Date: Sep. 10, 2020

(65) Prior Publication Data
US 2022/0134217 A1   May 5, 2022

(30) Foreign Application Priority Data
Mar. 4, 2019   (KR) .................. 10-2019-0024565

(51) Int. Cl.
*A63F 9/14*     (2006.01)
*B64C 39/02*    (2023.01)
*A63F 9/24*     (2006.01)

(52) U.S. Cl.
CPC ............ *A63F 9/143* (2013.01); *B64C 39/024* (2013.01); *A63F 2009/2442* (2013.01);
(Continued)

(58) Field of Classification Search
CPC .............. A63F 9/143; A63F 2009/2442; A63F 2009/2457; A63F 2009/2461;
(Continued)

(56) References Cited

U.S. PATENT DOCUMENTS 10,417,755 B1 *  9/2019  Wingo .................. H04W 24/04
10,880,465 B1 * 12/2020  Svendsen ............. H04N 23/611
(Continued)

FOREIGN PATENT DOCUMENTS

JP      2002360795 A    12/2002
KR      20100000812 U    1/2010
(Continued)

OTHER PUBLICATIONS

3D Printed Air Gates for Drone Racing With HC-SR04', Circuito.io blog, Jun. 8, 2017, https://www.circuito.io/blog/hc-sr04-air-gate-for-drones/.
(Continued)

*Primary Examiner* — Pierre E Elisca
(74) *Attorney, Agent, or Firm* — BROADVIEW IP LAW, PC

(57) ABSTRACT

The present invention provides a drone-passing multiple detection sensor gate comprising: a gate having a ring-like structure through which a drone can pass during flight; a first sensor, disposed on the front or the inner front of the gate, for detecting whether the drone approaches the gate or passes through the front side of the gate; a second sensor, disposed on the inner rear of the gate, for detecting whether the drone sensed by the first sensor passes through the rear side of the gate; a detection signal transmitter, disposed
(Continued)

inside or on a surface of the gate, for receiving, from the first sensor and the second sensor, the detection signal indicating whether the drone approaches or passes through the gate, and wirelessly transmitting the detection signal. In addition, the present invention provides a drone game system using a multiple detection sensor gate.

7 Claims, 10 Drawing Sheets

(52) U.S. Cl.
CPC ............... *A63F 2009/2457* (2013.01); *A63F 2009/2461* (2013.01); *A63F 2009/2488* (2013.01); *A63F 2300/6063* (2013.01); *A63F 2300/8017* (2013.01)

(58) Field of Classification Search
CPC ...... A63F 2009/2488; A63F 2300/6063; A63F 2300/8017; A63F 7/0616; A63F 2250/52; A63F 7/3065; A63F 13/803; A63F 7/30; A63F 2007/3015; B64C 39/024; A63K 1/00; B64F 1/20; B64U 2101/00
USPC ............................................................ 463/6
See application file for complete search history.

(56) References Cited

U.S. PATENT DOCUMENTS

| | | |
|---|---|---|
| 2016/0158638 A1 | 6/2016 | Olsen |
| 2017/0050748 A1* | 2/2017 | Byers .................... B64C 39/024 |
| 2019/0023392 A1* | 1/2019 | Micros .................. B64C 33/025 |
| 2021/0041241 A1* | 2/2021 | Mitra .................. G01C 21/3423 |
| 2021/0237898 A1* | 8/2021 | Gury ...................... B64D 47/08 |
| 2021/0239434 A1* | 8/2021 | Gury ........................ G05D 1/12 |

FOREIGN PATENT DOCUMENTS

| | | |
|---|---|---|
| KR | 2020170000908 U | 3/2017 |
| KR | 101740265 B1 | 5/2017 |
| KR | 1020180025792 A | 3/2018 |
| KR | 101857245 B1 | 5/2018 |
| KR | 1020190133036 A | 11/2019 |
| KR | 1020200008224 A | 1/2020 |
| KR | 20200033390 A | 3/2020 |
| WO | 2018232788 A1 | 12/2018 |

OTHER PUBLICATIONS

Office Action, from KIPO (Korean Intellectual Property Office), for KR Patent Application No. 10-2020-0062834 dated Feb. 28, 2022.

* cited by examiner

DRONE-PASSING MULTIPLE DETECTION SENSOR GATE AND DRONE GAME SYSTEM USING SAME

CROSS-REFERENCE TO RELATED APPLICATIONS

This application is the U.S. National Stage filing under 35 U.S.C. 371 of International Application No. PCT/KR2019/014235, filed on Oct. 28, 2019, which claims priority to Korean Patent Application No. 10-2019-0024565, filed on Mar. 4, 2019, the contents of which are hereby incorporated by reference in their entirety.

TECHNICAL FIELD

The present disclosure relates to a drone game system, and in particular, a new drone game system capable of accurately determining whether a drone passes a gate by using a gate through which the drone in flight passes and multiple detection sensors, and link image or sound information according to whether the drone passes or not.

BACKGROUND ART

A drone is an unmanned aerial vehicle having an airplane- or helicopter-shape capable of flying and being controlled by radio wave guidance without a pilot on board.

Drones were developed for military use. As their scope of application has expanded to various fields, drones are being applied to aerial imaging, photography, product delivery, weather information collection, and pesticide spraying. As the supply of drones is expanded from military to civilian use, the demand for drones is also increasing rapidly, and while prices are falling and miniaturization, commercial use is increasing as mobility is strengthened, and there is a forecast that the 'one-person, one-drone era' will come.

Drones are changing many fields, and in the media field, it has become possible to shoot accident sites where safety is not secured, and in the logistics field, delivery using drones has improved the accuracy, efficiency, and convenience of returns, leading to expectation that consumption patterns will change from 'purchase' to 'lease'. In the information and communication field, it is expected that a global network and communication network to replace the existing network will be built, and in the agricultural field, drones are being used to dodge the labor shortage for pesticide spraying, crop seeding, and forest protection.

In addition, drone games using aerial control of drones are being newly developed. For example, there are a racing game in which passes a certain course in a short time or a soccer game that scores points by passing a 'goal' at a fixed location. Offline games using drones are positive in that they not only promote the development of drone-related industries, but allow teenagers who are addicted to electronic devices such as smartphones to participate in active games.

In this regard, Korean Patent Application No. 10-2017-0047793 discloses a game system using a drone in which a game is conducted in a method of earning points when a reference gym ball drone contacts a screen part or the reference gym ball drone passes through the gate frame by dribbling while moving the reference gym ball drone that plays as a ball.

In addition, Korean Patent Application No. 10-2017-0119683 discloses a drone racing game system, specifically technique including sensor gates each having a predetermined structure shape and arranged at regular intervals in a racing space to form a racing course, sensor gates detecting whether a drone piloted by a game participant has passed the racing course, and transmitting detected drone detection information to a gamer terminal possessed by the game participant in real time; the gamer terminal having a built-in game app that enables the drone racing game to be implemented online by receiving the drone detection information from the sensor gates in real time; and a game operating server that communicates with the gamer terminal and provides comprehensive services necessary for operating the drone racing game to game players.

However, in the case of the prior art, there is a problem in accurately determining whether the drone has passed because there is a limit to the detection ability and frequent errors during drone racing or gate pass. In particular, the drone soccer game being played in Korea detects the pass of a drone by using a stand-type ring as a goalpost (see FIG. 1). Even when the drone does not pass through and collides with the goalpost, 'counting' in which scores changes occurs or when the drone is temporarily staying in the goalpost, scoring occurs, thus making it difficult to calculate the correct score.

Due to this problem, in the actual drone soccer game, whether or not the drone's goal (pass) is dependent on the judge's visual judgment rather than automatically detected by sensors. Eventually, the existing 'goalpost' for drone soccer simply functions as a structure through which the drone passes, and there is a limit to development into e-sports using drones.

In order for drone soccer to expand the new offline game market using drones and to arouse the active participation of consumers, exciting and realistic game progress needs to be guaranteed, and the score needs to be electronically reflected at the same time as the drone's goal. In addition, it is necessary to maximize the enjoyment and sense of achievement of the game by providing visual and auditory progress during the drone game.

DISCLOSURE

Technical Problem

The present disclosure was created under the technical background described above, and an object of the present disclosure is to provide a new drone game system that is full of excitement and realism through drone control by players.

Another object of the present disclosure is to provide a drone game system that accurately detects whether a drone passes through a gate during a game process.

Still another object of the present disclosure is to provide a drone game system capable of broadcasting game progress in real time, such as whether a drone passes through a gate to be developed into offline e-sports.

In addition, other objects and technical features of the present disclosure will be presented in more detail in the following detailed description.

Technical Solution

To achieve the objects of the present disclosure, a drone pass multi-detection sensor gate includes a gate having a ring-shaped structure through which a drone is able to pass during flight, a first sensor disposed in a front or inner front of the gate to detect whether the drone approaches the gate or whether the drone passes through the gate from the front of the gate, a second sensor disposed in inner rear of the gate to detect whether the drone detected by the first sensor passes through the gate from a rear of the gate, and a detection signal transmitter disposed an inside or surface of the gate to receive detection signals indicating whether the drone is approaching or passing through the gate, from the first sensor and the second sensor and wirelessly transmit the detection signals.

Further, according to the present disclosure, a drone game system using a drone pass multi-detection sensor gate includes one or more gates having a ring-shaped structure through which a drone is able to pass during flight, a proximity sensor disposed in a front of the gate to detect whether a drone in flight approaches the gate, a first pass detection sensor disposed in an inner surface of the gate to detect whether the drone in flight passes through the gate, a detection signal transmitter that receives detection signals from the proximity sensor and the first pass detection sensor and wirelessly transmits the detection signals, a main controller that receives the detection signals and provides image information and sound information according to a result of the detection signals, a display that outputs the image information; and a speaker that outputs the sound information, wherein the image information or the sound information according to the pass of the drone is output when the drone in flight is first detected by the proximity sensor and then detected by the first pass detection sensor within a predetermined time.

The gate may be formed in a multi-ring structure in which a first ring and a second ring are disposed adjacent to each other, the first pass detection sensor may be disposed on the first ring, and the second pass detection sensor that detects whether the drone detected by the first pass detection sensor passes through the second ring may be disposed on the second ring.

The first sensor, the first pass detection sensor, the second sensor, and the second pass detection sensor include a photocoupler, and the first sensor, the second sensor, sensors disposed on the first ring and sensors disposed on the second ring are arranged such that detection directions thereof cross one another.

The drone game system of the present disclosure may further include a camera that photographs a situation in which a drone in flight passes through a gate, and a video recorder that records a video photographed by the camera and transmits the video to the main controller.

The drone game system according to the present disclosure may further include a drone detection sensor that detects the ID or color of the drone when the drone in flight approaches the gate or passes through the gate.

Further, according to the present disclosure, a drone game system using a drone pass multi-detection sensor gate, includes one or more gates having a ring-shaped structure through which a drone is able to pass during flight, a first pass detection sensor disposed in an inner front of the gate to detect whether a drone in flight passes through the gate from a front of the gate, a second pass detection sensor disposed in inner rear of the gate to detect whether the drone detected by the first pass detection sensor passes through the gate from a rear of the gate, a detection signal transmitter that receives detection signals from the first pass detection sensor and the second pass detection sensor and wirelessly transmits the detection signals, a main controller that receives the detection signals and provides image information and sound information according to a result of the detection signals, a display that outputs the image information, and a speaker that outputs the sound information, wherein the image information or the sound information according to the pass of the drone is output when the drone in flight is first detected by the first pass detection sensor and then detected by the second pass detection sensor.

Advantageous Effects

According to the present disclosure, it is possible to provide a multi-detection sensor gate capable of electronically detecting whether a drone approaches or passes through a gate and a new drone game system using the same.

In addition, according to the present disclosure, it is possible to present a standard for a new game using a drone by detecting the accurate pass of a drone in flight through a gate installed in an indoor space or outdoors, and enabling electronic counting and real-time broadcasting and to achieve development into international e-sports.

In addition, according to the present disclosure, it is possible to enable viewers to experience the same realistic and thrilling drone game as sports broadcasting and viewing, and enable players to enjoy new e-sports that inspire a sense of achievement and competition, and increase the cheering and immersion of spectators.

By using the multi-detection sensor gate of the present disclosure, it is possible to reduce the manpower required to operate a drone game, and franchise a drone soccer game, and it is also expected to be used as a new tourism resource.

MODE FOR INVENTION

The present disclosure may propose a multi-detection sensor gate, as a ring-shaped gate through which a drone in flight can pass, that detects whether the drone is in proximity or not and whether the drone has passed. In addition, the present disclosure may provide a new drone game system that accurately detects whether a drone has passed through a gate according to the driving of a drone in a game space in which a multi-detection sensor gate is installed and outputs an image or sound according to a result of the detection.

Figure 1:
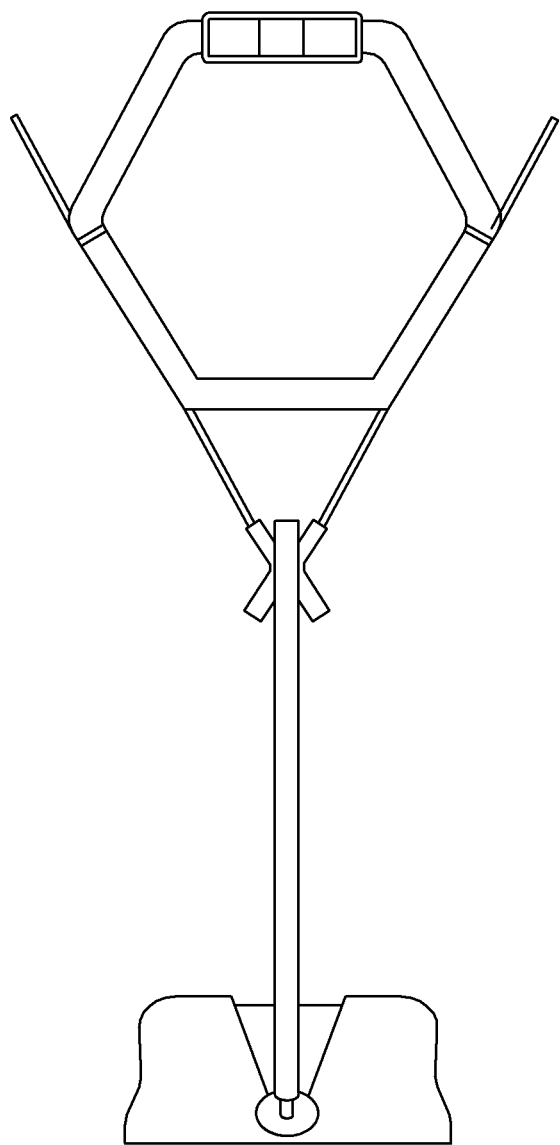
FIG. 1 is a photograph showing a drone soccer goalpost having a conventional stand-type ring structure.
Figure 2:
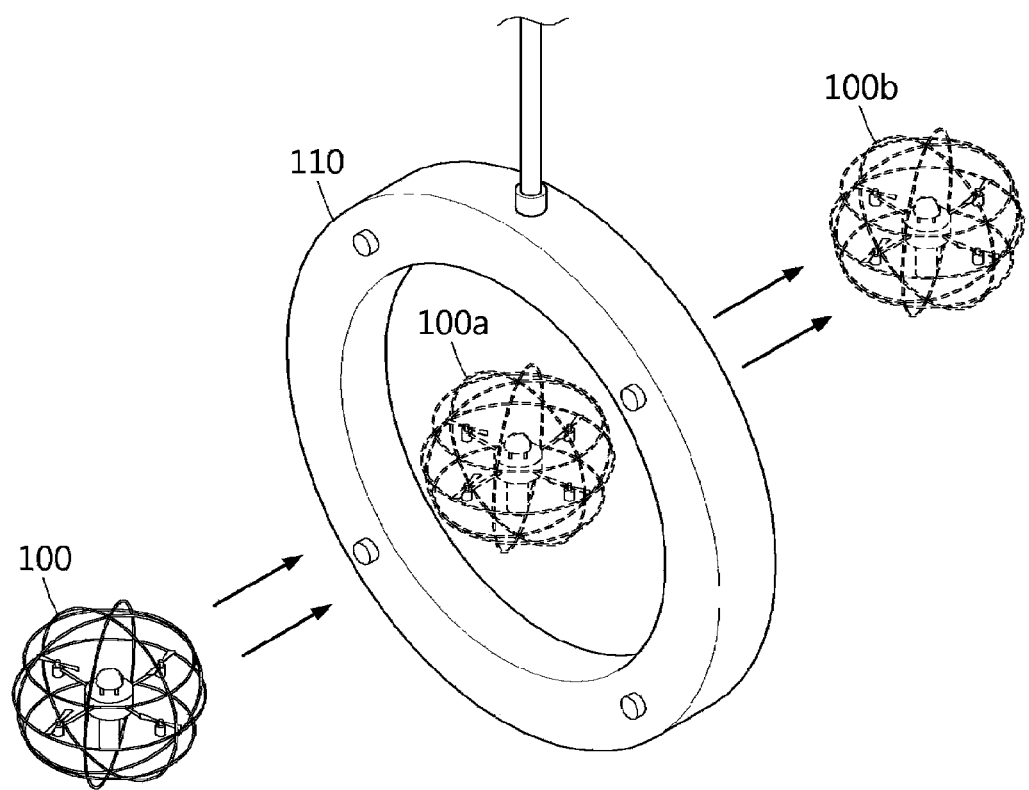
FIG. 2 is a schematic diagram showing a drone passing through a gate according to the present disclosure.

FIG. 2 is a schematic diagram showing a drone 100 passing through a gate 110 according to the present disclosure, and when the drone has passed through the gate which is fixed on a support (not shown) installed on the ground or suspended in the air with a wire (see 100*a*, 100*b*), a soccer game is conducted to score a goal or a drone game is conducted to convert the pass of the drone into a score. In conducting such a drone game, it is very important to accurately determine whether or not the drone passes through a gate or the direction in which the drone passes. For example, when the direction in which the drone passes cannot be clearly detected, scoring may be continued with only a motion in which the drone moves in and out of the gate repeatedly around the gate and game progress may be canceled. In addition, to implement e-sports full of excitement using drones, technical means are required to broadcast the situation where the drone approaches the gate as well as whether the drone passes through the gate or not, with tension.

The present disclosure may accurately detect whether a flying drone is in the proximity of a drone pass gate and the flying drone passes through the drone pass gate by providing the drone pass gate having multiple detection sensors. In addition, it is possible to prevent scoring in advance when a drone player (or operator) accidentally allows the drone to pass through the gate by detecting whether the drone passes through the drone pass gate in consideration of the directionality of the drone. Specifically, the present disclosure provides a gate having a ring-shaped structure through which a drone is able to pass during flight, that is, multi-detection sensor gate including a first sensor disposed in the front or at the inner front of the gate to detect whether the drone approaches the gate or whether the drone passes through the gate from the front of the gate, and a second sensor disposed at the inner rear of the gate to detect whether the drone, which is detected by the first sensor, passes through the gate from the rear of the gate. The inside or surface of the gate may be provided with a detection signal transmitter that receives and wirelessly transmits a detection signal indicating whether the drone is approaching or passing through the gate, from the first sensor and the second sensor.

Such a multi-detection sensor gate may include one proximity sensor and one pass detection sensor. As a proximity sensor, for example, an ultrasonic sensor may be used to detect the front thereof and detect that a drone in flight approaches a gate and give directionality associated with drone pass in cooperation with the pass detection sensor. By using the proximity sensor, it is possible to output or broadcast a 'proximity situation' in which a drone approaches a gate, for example, a situation in which the drone approaches a surface of the gate at 1.5 m, 1 m, or 0.5 m to a display or via sound to make the drone game more exciting. As the pass detection sensor, for example, a photocoupler including a light transmitter and a light receiver may be used, and the pass detection sensor detects whether the drone passes through the gate. The directionality of drone pass may be determined in such a way to recognize the pass of the drone when the ultrasonic sensor detects that the drone approaches the gate and the photocoupler detects that the drone passes through the gate and output an image or sound through a display or speaker. Conversely, when the drone pass through the gate is detected through detection by the ultrasonic sensor after detection by the photocoupler, it may not be recognized as a normal pass of the drone. In this way, it is possible to accurately detect whether the drone passes through the gate and its directionality, and according to this detection method, it is possible to set the standard for a new drone game by clarifying the rules for drone pass.

In the case of using an ultrasonic sensor as a proximity sensor, it is preferable to determine the arrangement shape and number of sensors on the gate by appropriately calculating the range of an ultrasonic angle according to the size of the gate, the size of the drone, the flight speed, or the like The multi-detection sensor gate of the present disclosure may include a front-pass detection sensor and a rear-pass detection sensor as dual sensors. In this case, it is preferable that the two pass detection sensors be spaced apart in the gate, and whether or not the drone passes through the gate may be determined while giving directionality according to the detection order of the sensors. For example, when the gate pass is detected by being first detected by the front-pass detection sensor and then detected by the rear-pass detection sensor and passes through the gate, it is recognized that the drone has passed, and when the gate pass is detected in an opposite way, the pass may not be recognized. In this case, the proximity sensor may be selectively included as needed.

Determination of whether or not the drone has passed may be performed in such a way that a main controller receives signals detected by sensors and determines whether the drone has passed and corresponding image information may be then output to a display or the like. In addition, the gate where the sensor is disposed and the main controller that determines whether the drone has passed or not are separated from each other, thereby resolving a problem in which scoring is continued even when the drone collides with the gate in which a sensor and a scoreboard are embedded together.

Figure 3:
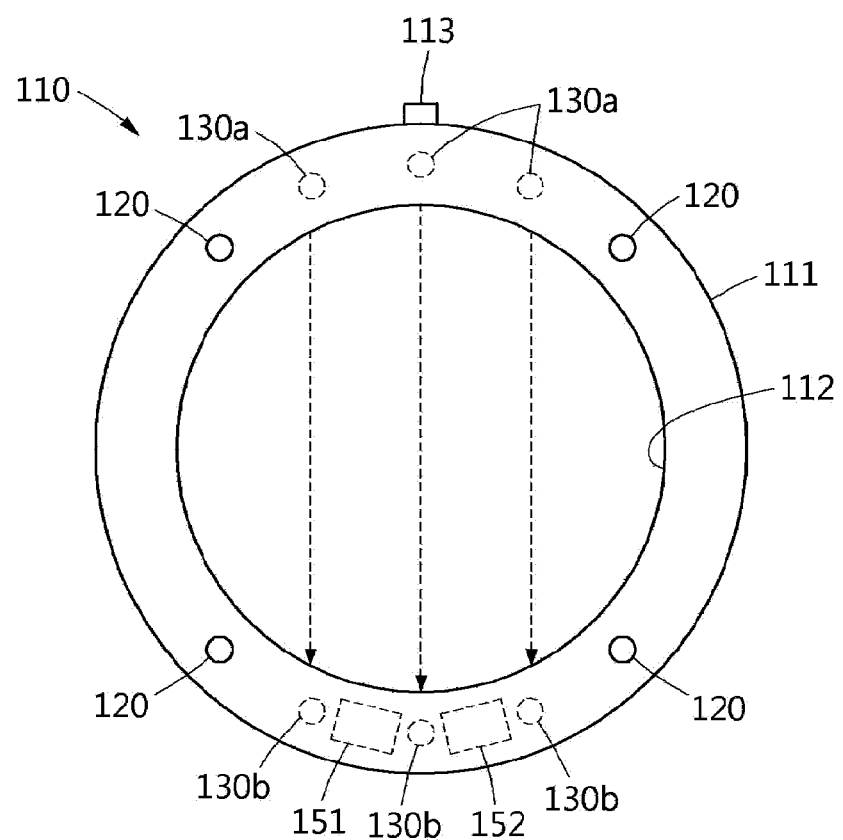
FIG. 3 is a front view showing a drone pass gate according to an embodiment of the present disclosure.
Figure 4:
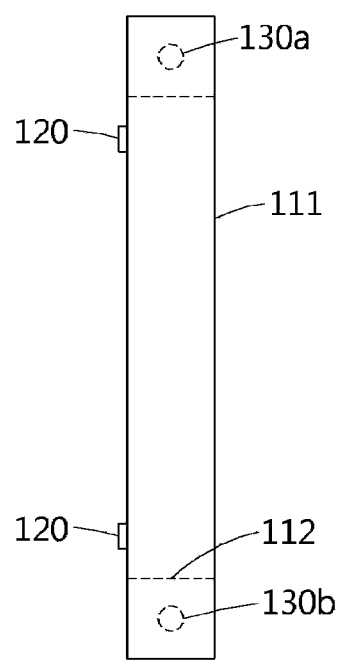
FIG. 4 is a side view of the drone pass gate of FIG. 3.

FIG. 3 is a front view showing a drone pass gate according to an embodiment of the present disclosure, and FIG. 4 is a side view of the drone pass gate of FIG. 3.

The gate 110 is a circular ring structure 111 with an open inside through which the drone is able to pass during flight. A total of four proximity sensors 120 that detects whether a drone in flight is approaching are arranged in the front of the gate to be spaced apart. In addition, three pairs of first pass detection sensors 130a and 130b for detecting whether a flying drone passes through the gate are arranged in an inner surface 112 of the gate. The first pass detection sensor may include a light transmitter 130a and a light receiver 130b of a photocoupler and is partially exposed on the inner surface of the gate such that the light receiver receives a signal from the light transmitter. The number and arrangement of proximity sensors and pass detection sensors may vary depending on the size of the gate and the size of the drone.

A wire connection part 113 to which a physical support means for suspending the gate in the air along with the electrical connections of sensors and a controller is connected is provided at the upper end of the gate. In addition, a proximity sensor controller 151 that controls a proximity sensor and transmits a detected signal and a pass detection sensor controller 152 that controls a pass detection sensor and transmits a detected signal are embedded in the gate. If necessary, it is also possible to implement an integrated detection signal transmitter by configuring the proximity sensor controller and the pass detection sensor controller as a single PCB, or the like.

Figure 5:
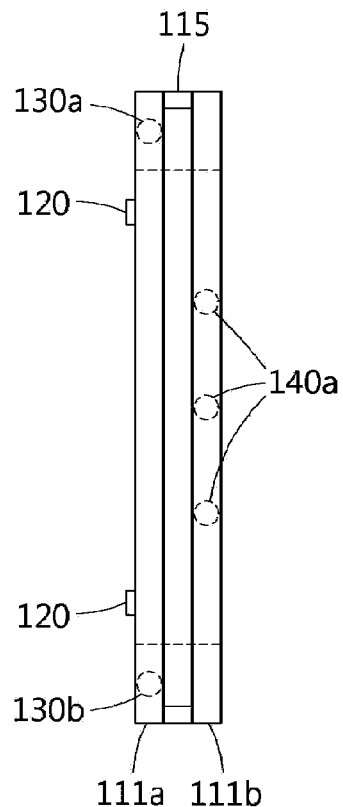
FIG. 5 is a side view showing a drone pass gate according to another embodiment of the present disclosure.

FIG. 5 is a side view showing a drone pass gate according to another embodiment of the present disclosure in which a gate is formed in a multi-ring structure in which a first ring 111a and a second ring 111b are arranged adjacent to each other, and the two rings are integrated into one structure through a connection part 115. First pass detection sensors 130a and 130b are disposed inside the first ring, and a second pass detection sensor 140a for detecting whether a drone detected by the first pass detection sensor has passed through the second ring is disposed inside the second ring. The proximity sensor 120 is disposed in the front of the first ring to detect whether a drone is approaching and whether the drone has passed through the gate is detected based on the detection order of the first pass detection sensor and the second pass detection sensor.

Figure 6:
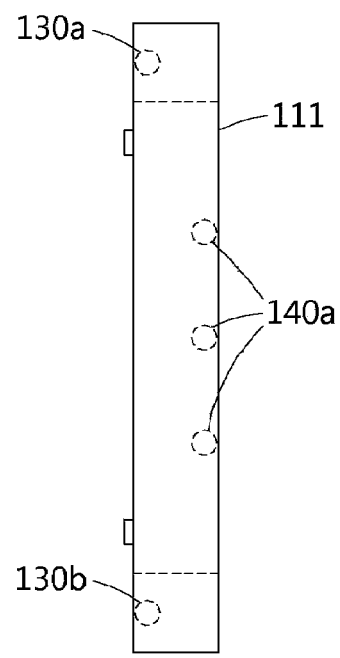
FIG. 6 is a side view showing a drone pass gate according to still another embodiment of the present disclosure.
Figure 7:
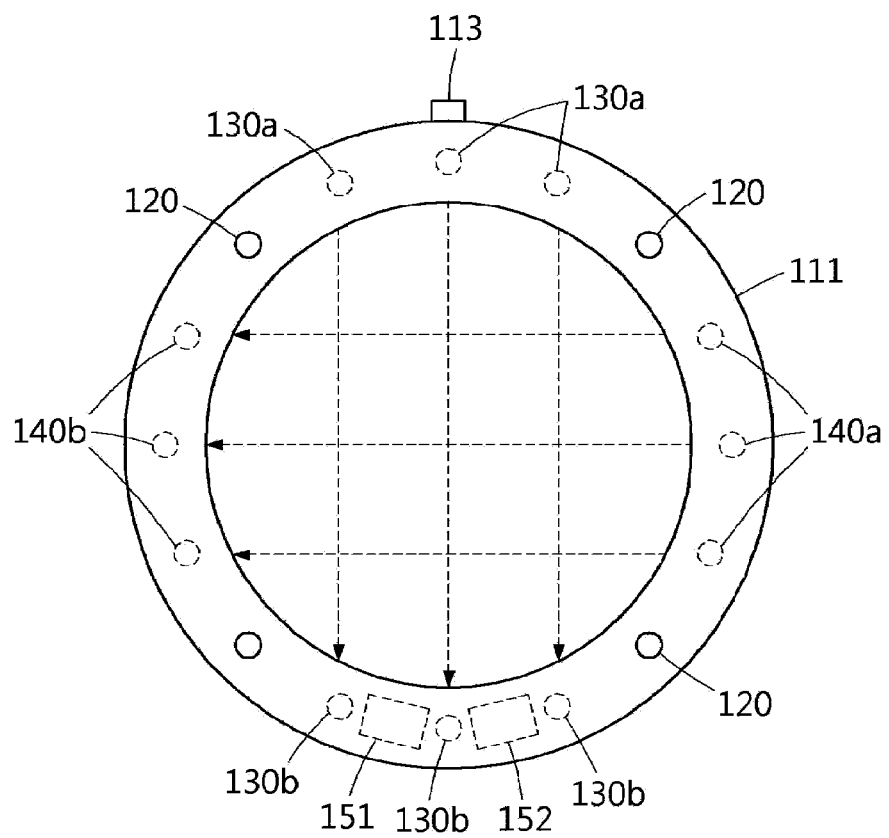
FIG. 7 is a front view of the drone pass gate of FIG. 6.

In a gate with a multi-ring structure in which a first ring and a second ring are arranged adjacent to each other, the first ring and the second ring are formed as a single structure without being physically separated from each other, and it is possible to perform detection in consideration of directionality of the drone pass by changing the arrangement of the pass detection sensors. FIG. 6 is a side view showing a drone pass gate according to another embodiment of the present disclosure, and FIG. 7 is a front view of the drone pass gate of FIG. 6. In this embodiment, a proximity sensor is disposed in the front of a gate, and a first pass detection sensor and a second pass detection sensor are embedded in the gate. The first pass detection sensors 130a and 130b for detecting whether the drone in flight has passed through the gate from the front of the gate are disposed at the inner front of the gate, and the second pass detection sensors 140a and 140b for detecting whether the drone detected by the first pass detection sensors has passed through the gate from the rear of the gate is disposed at the inner rear of the gate.

As described above, when the first pass detection sensors and the second pass detection sensors are embedded in one ring structure, as shown in FIG. 7, it is preferable that both detection directions cross each other such that the first pass detection sensors transfer signals in a vertical direction, and the second pass detection sensors transfer signals in a horizontal direction. In addition, in the embodiment related to FIG. 5 as described above, it is preferable that the sensors disposed in the first ring and the sensors disposed in the second ring are arranged such that both detection directions cross each other. Through such a sensor arrangement, it is possible to minimize interference or transmission/reception error in signal transmission between the first pass detection sensors and the second pass detection sensors.

Figure 8:
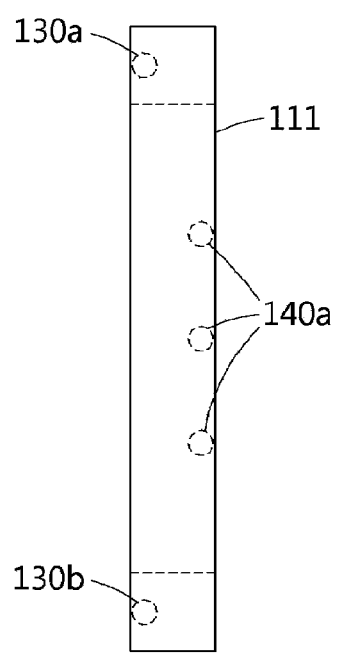
FIG. 8 is a side view showing a drone pass gate according to still another embodiment of the present disclosure.

FIG. 8 is a side view showing a drone pass gate according to another embodiment of the present disclosure. Unlike the above-described embodiment, a first pass detection sensor that detects whether a drone passes through a gate from the front of the gate is disposed in the inner front of the gate without a proximity sensor disposed in the front of the gate, and a second pass detection sensor that detects whether the drone detected by the first pass detection sensor passes through the gate from the rear of the gate is disposed in the inner rear of the gate. It is advantageous that such gates are used when conducting drone games at facilities such as drone education sites or schools that do not require on-site broadcasting according to whether or not drones are approaching.

Figure 9:
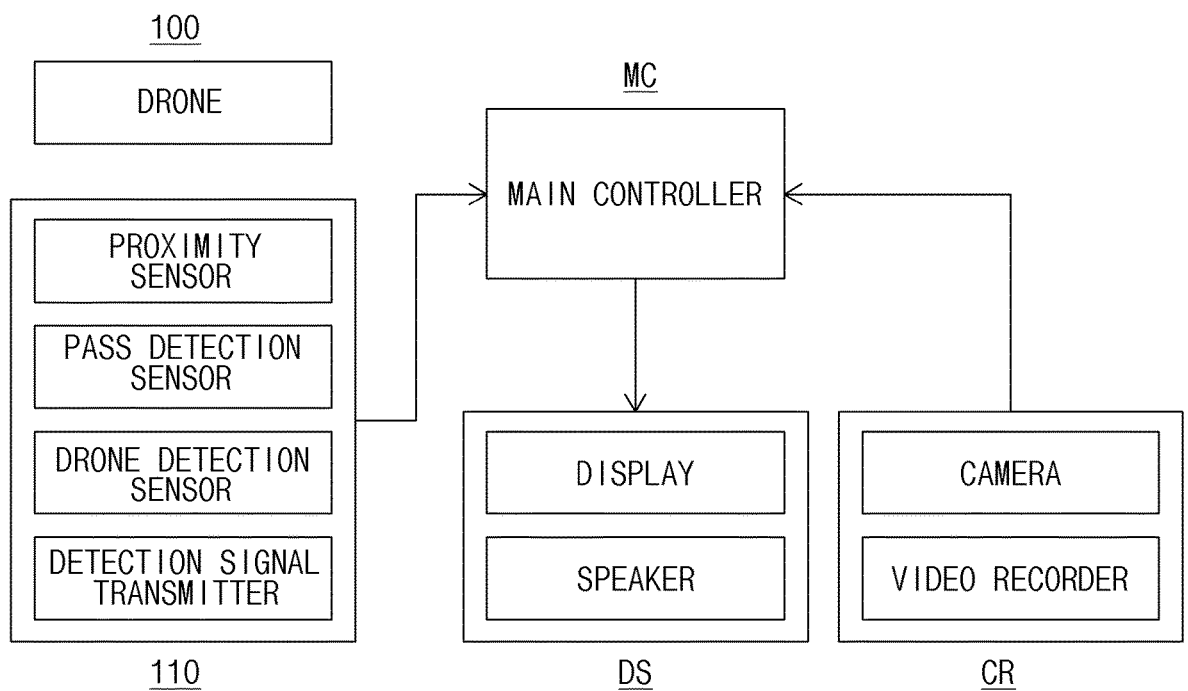
FIG. 9 is a block diagram of a drone game system according to the present disclosure.

A new drone game system completely different from an existing flight-based drone game may be implemented by configuring a drone pass multi-detection sensor gate according to the present disclosure together with an output device such as a separate controller and a display. FIG. 9 is a block diagram of a drone game system according to the present disclosure.

Whether the drone 100 is approaching and passing through a gate may be detected using various sensors of the gate 110 during flight of the drone.

Signals detected by the sensors are transmitted to a main controller (MC) through a detection signal transmitter, and the main controller may determine whether the drone approaches or passes through the gate based on a received detection signal, and provide image information or sound information according to a result of the determination. To this end, the drone game system of the present disclosure may include an output system (DS) including a display for outputting image information and a speaker for outputting sound information. The display may output image information, which has been stored in the main controller or the display in advance, according to a command of the main controller, and the speaker may simultaneously output a corresponding sound in cooperation with the display. It is preferable that the main controller controls output of the image or sound to output image information or sound information according to the pass of the drone, for example, when the drone in flight is first detected by the proximity sensor of the gate and then detected by the first pass detection sensor within a predetermined time. In this way, by limiting a detection time interval between two sensors, it is possible to prevent a pass error when the drone detected by the proximity sensor flies around the gate without passing through the gate immediately and a part of the drone is then detected by the first pass detection sensor behind the gate. The detection time interval between the two sensors may vary depending on the size of the gate, the size of the drone, and the flight speed of the drone, and may be determined, for example, from 0.1 seconds to 3 seconds.

On the other hand, the multi-detection sensor gate according to the present disclosure may preferably further include a drone detection sensor that detects the ID or color of the drone when the drone in flight approaches the gate or passes through the gate. A unique signal generator may be added to the drone to identify the drone's ID when the drone is passing through the gate, and a receiver may be added to the gate to identify the drone's signal. In addition, a color sensor may be added to the gate to detect a color of the drone. Such a drone detection sensor is advantageous for real-time game broadcasting by determining whether a specific drone approaches or passes through the gate in advance and outputting a result of the determination in real time through a display or a speaker. In addition, through a drone detection sensor capable of identifying the ID or color of the drone, it is possible to recognize the pass of the drone only related to a specific gate within a game space where multiple gates are installed. For example, in a soccer game using a drone, a goal is recognized only when the drone passes through a gate to be attacked, and a goal is determined as an 'own goal' and may not be recognized as a goal when the drone passes through a gate to be defended. To identify the ID of a drone, an identification tag containing information such as an RFID tag or a transmitter that transmits a signal may be attached to the drone, and the drone detection sensor may include a means for detecting a remotely located identification tag such as an RFID sensor or a receiver for receiving a signal transmitted from a transmitter attached to a drone remotely located. For such wireless communication, various means using radio waves or light may be used in drones and drone detection sensors.

The drone game system of the present disclosure may further include an imaging device (CR) further including a camera that photographs a situation in which a drone in flight passes through a gate, and a video recorder that records images photographed by the camera and transmits the images to the main controller. By photographing the situation in which the drone passes the gate with a camera and displaying the situation on a display such as an electric signboard in real time, achieving real-time broadcasting, being advantageous for sharing of image information through the Internet, and being used for video reading of whether the drone has passed or not.

Figure 10:
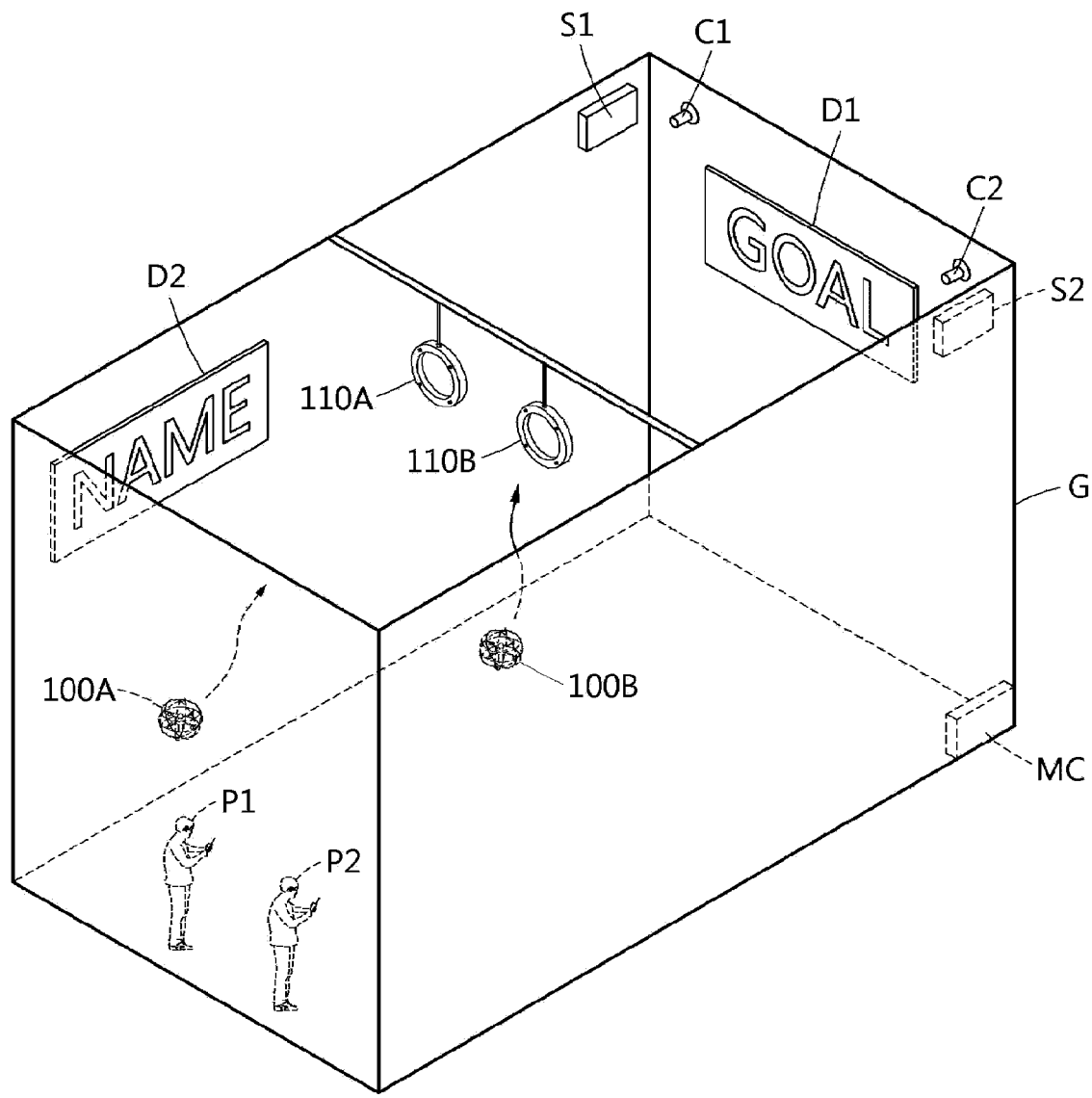
FIG. 10 is a schematic diagram of a drone game system according to the present disclosure.

FIG. 10 is a schematic diagram showing a drone game system of the present disclosure. In the illustrated drone game system, multiple detection sensor gates 110A and 110B of the present disclosure are suspended in the air at appropriate positions in a game space (G). For the drone game space, for example, a space defined by walls, nets or glass walls may be used outdoors, in addition to an indoor space. In addition, the gate may be connected to a rod or pipe protruding from a wall of the game space without being suspended in the air, and may be operated while being fixed to a support extending vertically from the floor.

The game can be played in such a way to allow the drones 100A and 100B to pass through the gate while flying by the manipulation of the players P1 and P2. For convenience, the number of players and the number of drones are limited to two, but the number of players and drones may be further increased depending on the characteristics or method of the game, and two or more gates may also be arranged spaced apart in the game space. In addition, the gates may be arranged side by side on one side in the game space, or may be arranged to face each other. Players may be positioned within the game space, or may remotely control drones from outside the game space with spectators.

A typical drone is composed of a servomotor and a rotor radially arranged around a central controller, and is divided into quadcopter, hexacopter, and octocopter according to the number of motors and rotors. In the drone game system of the present disclosure, the number of motors and rotors does not need to be particularly limited, but as shown in FIG. 2, it is advantageous that the drone includes a cage-type spherical protective guard on the outskirt of the drone to implement a flexible motion of passing through a gate while mitigating the impact of the drone and the gate.

Inside the game space, a main controller (MC) may be disposed that receives detection signals transmitted from sensors of the gate, determines whether the drone has passed, and executes various commands for outputting images or sound. The main controller may use, for example, a computer, and a memory, a detection signal receiver, an image information receiver, a wireless communication device, and the like may be embedded therein. In addition, at least one or more displays D1 and D2 that display image information or counting information and sound information output speakers S1 and S2 that output game progress effects simultaneously or alone with the image information are disposed on a front wall or side wall of the game space.

Unlike an existing drone gate that recognizes the pass of a drone when the gate passes through the gate regardless of the front and rear directions, or scoring is continued even when the drone stays inside the gate, it is possible to produce an accurate match in such a way that players operate drones such that the drones pass through with directionality by using the multi-detection sensor gate of the present disclosure. In particular, the drone's approach to the gate may be identified in real time, so players' desire to win may be doubled, and spectators watching a game near a game space may enjoy the game reality concentratedly.

The drone approaching the gate passes through two sensors sequentially to identify whether the drone has passed the gate, and this process may be broadcast through a relevant image such as a goal image or a sound such as a shout sound using a display or a speaker in real time according to the determination and command of the main controller. In relation to the gate pass, the main controller may be set to recognize an additional pass after a predetermined time, for example, 2 to 10 seconds, after the drone has passed the gate once. Such a setup program may prevent the drone from repeatedly going back and forth through the gate while staying only around the gate.

In addition, the cameras C1 and C2 are installed around the gate to photograph and display a scene of the drone passing through the gate in real time. On the other hand, it is possible to extract a video image obtained by photographing a gate at the time the drone passes the gate and output the appearance of the player of the corresponding drone to the display. In addition, a video recorder may receive and transmit a video to the main controller at the time when the drone passes through the gate, synthesize the video, graphic effects and the like, and output a result of the synthesis to the display or automatically transmit the result to other media channels such as the Internet.

In the drone game system of the present disclosure, the multi-detection sensor gate may directly express visual effects for approach or pass of the drone by including a light emitting lamp or a laser in each sensor or separately therein. In addition, the gate may have any shape, such as an open structure such as a polygonal ring or a horseshoe shape, as long as it can accurately determine whether the drone has passed through the gate, in addition to a closed ring structure.

The drone game space may be equipped with floor safety nets, side safety nets, front and rear safety nets, and upper safety nets for the safety of players, surrounding spectators, and drones, and the installation location and number of gates, and the scale and dimensions of the stadium may vary depending on the number of drones and the number of players. For example, when two gates are installed in one game space, the composition of the player may be changed in teams of two, four or multiple persons.

Through the multi-detection sensor gate of the present disclosure, it is possible to provide a drone game system which accurately and automatically counts the pass of the drone and provides a relevant electronic broadcasting screen in real time, while providing a realistic and thrilling thrill just like actual sports broadcasting and watching. Through this technology, players may enjoy dynamic drone sports such as soccer games using drones as well as drone 'pass' racing games, and new e-sports and international drones matches may be implemented, which inspire a sense of achievement and competition, and increase the cheering and immersion of spectators.

Although the present disclosure has been exemplarily described through the preferred embodiments, the present disclosure is not limited to such specific embodiments, and may be modified, changed, or improved in various forms within the scope of the technical idea presented in the present disclosure, specifically, claims.

The invention claimed is:

1. A drone pass multi-detection sensor gate comprising:
a gate having a ring-shaped structure through which a drone is able to pass during flight;
a first sensor disposed in a front or inner front of the gate to detect whether the drone approaches the gate or whether the drone passes through the gate from the front of the gate;
a second sensor disposed in inner rear of the gate to detect whether the drone detected by the first sensor passes through the gate from a rear of the gate; and
a detection signal transmitter disposed an inside or surface of the gate to receive detection signals indicating whether the drone is approaching or passing through the gate, from the first sensor and the second sensor and wirelessly transmit the detection signals.

2. The drone pass multi-detection sensor gate of claim 1, wherein the gate is formed in a multi-ring structure in which a first ring and a second ring are disposed adjacent to each other, the first sensor being disposed on the first ring, and the second sensor being disposed on the second ring.

3. The drone pass multi-detection sensor gate of claim 2, wherein the first sensor and the second sensor include a photocoupler, and sensors disposed on the first ring and sensors disposed on the second ring are arranged such that detection directions thereof cross each other.

4. The drone pass multi-detection sensor gate of claim 1, further comprising:
   a drone detection sensor configured to detect an ID or color of the drone in flight when the drone in flight approaches or passes through the gate.

5. A drone game system using a drone pass multi-detection sensor gate, comprising:
   one or more gates having a ring-shaped structure through which a drone is able to pass during flight;
   a proximity sensor disposed in a front of the gate to detect whether a drone in flight approaches the gate;
   a first pass detection sensor disposed in an inner surface of the gate to detect whether the drone in flight passes through the gate;
   a detection signal transmitter configured to receive detection signals from the proximity sensor and the first pass detection sensor and wirelessly transmit the detection signals;
   a main controller configured to receive the detection signals and provide image information and sound information according to a result of the detection signals;
   a display configured to output the image information; and
   a speaker configured to output the sound information,
   wherein the image information or the sound information according to the pass of the drone is output when the drone in flight is first detected by the proximity sensor and then detected by the first pass detection sensor within a predetermined time.

6. The drone game system of claim 5, further comprising:
   a camera configured to photograph a scene in which the drone in flight passes through the gate; and
   a video recorder configured to record a video photographed by the camera and transmit the video to the main controller.

7. A drone game system using a drone pass multi-detection sensor gate, comprising:
   one or more gates having a ring-shaped structure through which a drone is able to pass during flight;
   a first pass detection sensor disposed in an inner front of the gate to detect whether a drone in flight passes through the gate from a front of the gate;
   a second pass detection sensor disposed in inner rear of the gate to detect whether the drone detected by the first pass detection sensor passes through the gate from a rear of the gate;
   a detection signal transmitter configured to receive detection signals from the first pass detection sensor and the second pass detection sensor and wirelessly transmit the detection signals;
   a main controller configured to receive the detection signals and provide image information and sound information according to a result of the detection signals;
   a display configured to output the image information; and
   a speaker configured to output the sound information,
   wherein the image information or the sound information according to the pass of the drone is output when the drone in flight is first detected by the first pass detection sensor and then detected by the second pass detection sensor.

* * * * *